(12) United States Patent
Papernyi et al.

(10) Patent No.: US 6,480,326 B2
(45) Date of Patent: Nov. 12, 2002

(54) CASCADED PUMPING SYSTEM AND METHOD FOR PRODUCING DISTRIBUTED RAMAN AMPLIFICATION IN OPTICAL FIBER TELECOMMUNICATION SYSTEMS

(75) Inventors: Serguei Papernyi, Pointe Claire (CA); Vladimir Karpov, Pointe Claire (CA); Wallace Clements, Pointe Claire (CA)

(73) Assignee: MPB Technologies Inc., Pointe-Claire (CA)

( * ) Notice: Subject to any disclaimer, the term of this patent is extended or adjusted under 35 U.S.C. 154(b) by 0 days.

(21) Appl. No.: 09/899,544

(22) Filed: Jul. 6, 2001

(65) Prior Publication Data

US 2002/0015220 A1 Feb. 7, 2002

Related U.S. Application Data

(60) Provisional application No. 60/217,104, filed on Jul. 10, 2000.

(51) Int. Cl.[7] ................................................ H01S 3/00
(52) U.S. Cl. .................................... 359/334; 359/341.3
(58) Field of Search ............................. 359/334, 341.3, 359/341.33; 372/3, 70

(56) References Cited

U.S. PATENT DOCUMENTS 4,700,339 A 10/1987 Gordon et al.

(List continued on next page.)

FOREIGN PATENT DOCUMENTS

EP 1022870 A 7/2000

(List continued on next page.)

OTHER PUBLICATIONS

Press Release Alcatel Optronics Enhances its Raman Product Line to Reduce System Amplification Cost, Mar. 19, 2001, OFC, Anaheim, California, 2 pages.

(List continued on next page.)

Primary Examiner—Mark Hellner
(74) Attorney, Agent, or Firm—Ogilvy Renault; James Anglehart

(57) ABSTRACT

A pumping scheme for distributed Raman amplification (DRA) in optical fiber telecommunication systems is disclosed in which pump energy at the wavelength(s) required for DRA of the transmitted optical signal(s) is developed within the transmission fiber through a series, n, where $n \geq 1$, of Raman conversions. In preferred embodiments, a 'primary' pump source of wavelength shorter than the ultimately desired pump wavelength(s) is launched into the fiber along with one or more significantly lower-power secondary 'seed' sources. The wavelength and power of the secondary source(s) are chosen such that, when combined with the high-power primary source, Raman conversions within the fiber ultimately lead to the development of high power at the desired pump wavelength(s). In another embodiment, one or more seed sources are replaced by reflecting means to return, into the fiber, backward-travelling amplified spontaneous Raman scattered light resulting from high power in the fiber at a wavelength one Raman shift below the desired seed wavelength. In either case, the high power at the wavelength(s) required for DRA of the signal(s) is developed over a distributed length of the fiber rather than being launched from a terminal point, as in the prior art. Consequently, the maximum power at the desired pump wavelength(s), and the peak signal gain, occur some distance into the fiber from the launch terminal. In one exemplary embodiment, a distributed Raman preamplifier, improved noise performance results, since the Raman gain occurs, on average, at a greater distance from the receiving terminal than with the standard pumping scheme.

28 Claims, 8 Drawing Sheets

U.S. PATENT DOCUMENTS

| | | | |
|---|---|---|---|
| 4,794,598 A | | 12/1988 | Desurvire et al. |
| 4,804,930 A | | 2/1989 | Simic-Glavaski |
| 5,058,974 A | | 10/1991 | Mollenauer |
| 5,111,334 A | | 5/1992 | Heidemann |
| 5,298,965 A | | 3/1994 | Spirit et al. |
| 5,620,571 A | | 4/1997 | Bahns et al. |
| 5,623,508 A | | 4/1997 | Grubb et al. |
| 5,673,280 A | | 9/1997 | Grubb et al. |
| 5,727,072 A | | 3/1998 | Raman |
| 5,742,416 A | | 4/1998 | Mizrahi |
| 5,790,300 A | | 8/1998 | Zediker et al. |
| 5,812,306 A | | 9/1998 | Mizrahi |
| 5,815,518 A | | 9/1998 | Reed et al. |
| 5,866,898 A | | 2/1999 | Hodgson et al. |
| 5,880,877 A | | 3/1999 | Fermann et al. |
| 6,001,131 A | | 12/1999 | Raman |
| 6,104,249 A | | 1/2000 | Fermann et al. |
| 6,040,571 A | | 3/2000 | Hodgson et al. |
| 6,052,219 A | | 4/2000 | Kidorf et al. |
| 6,147,794 A | * | 11/2000 | Stentz .......................... 359/334 |
| 6,163,394 A | | 12/2000 | Webb |
| 6,163,396 A | | 12/2000 | Webb |
| 6,163,636 A | * | 12/2000 | Stentz et al. .................. 385/24 |
| 6,204,960 B1 | | 3/2001 | Desurvire |
| 6,233,077 B1 | | 5/2001 | Alexander et al. |
| 6,307,986 B1 | | 10/2001 | Duerksen et al. |
| 6,321,004 B1 | | 11/2001 | Duerksen et al. |
| 6,327,061 B1 | | 12/2001 | Desurvire |

FOREIGN PATENT DOCUMENTS

| | | |
|---|---|---|
| EP | 1022870 A2 | 7/2000 |
| EP | 1026797 A | 8/2000 |
| EP | 1102114 A | 5/2001 |
| JP | 02159529 A2 | 6/1990 |
| JP | 02206737 A2 | 8/1990 |
| JP | 03013836 A2 | 1/1991 |
| JP | 04002933 A2 | 10/1991 |
| JP | 06331456 A2 | 12/1994 |
| JP | 07311120 A2 | 11/1995 |
| JP | 10022931 A2 | 1/1998 |
| JP | 010142076 A2 | 5/1998 |
| WO | WO98/28827 | 7/1998 |
| WO | WO99/66607 | 12/1999 |
| WO | WO 01 65647 A | 9/2001 |

OTHER PUBLICATIONS

Article—Fiber–Optic Communications Bandwidth Access and Telecommunication.ht. Oct. 15, 2001, 2 pages.

"Capacity Upgrades of Transmission Systems by Raman Amplification",by P. B. Hanson et al., IEEE Photonics Technology Letters, vol. 9, No. 2, Feb. 1997, pp. 262–264..

"Remote Amplification in Repeaterless Transmission Systems", by P. B. Hanson et al., Optical Fiber Technology 2, vol. 3, No. 3, 1997, pp. 221–237.

"A 92 nm Bandwidth Raman Amplifier", by Kartsen Rottwitt et al. Proceedings Optical Fiber Communication Conference, Feb. 1998, Paper PD–6.

"Transparent 80km Bi–Directionally Pumped Distributer Raman Amplifier with Second Order Pumping", Kartsen Rottwitt et al, pp. 144–145, Sep. 26–30 1999, Nice, France.

What is Hyper–Raman Gain? pp. 1 and 2, http://www.ift-o.uni–jena.de/~hannewd/explain_hyper.html.

Chang D I et al., "Efficient cascaded Raman generation and signal amplification at 1.3 mum in Ge02–doped single–mode fibre", Optics Communications, North–Holland Publishing Co. Amsterdam, NL., vol. 142, No. 4–6, Oct. 15, 1997, pp. 289–293.

Second–Order Distributed Raman Amplification with a High–Power 1370 nm Laser Diode, Vince Dominic et al., reprinted from the Optical Amplifiers and Their Applications, Conference 2001 Technical Digest, 2001 Optical Society of America, pp. 66–68.

Optimized Gain Distribution Map for Low–Noise Raman/EDF Hybrid Repeaters in Long Haul WDM Transmission, Naoki Suzuki et al., reprinted from the Optical Amplifiers and Their Applications, Conference, 2001 Technical Digest, 2001 Optical Society of America, pp. 69–71.

Dual–Order Raman Pump Providing Improved Noise Figure and Large Gain Bandwidth, J.–C. Bouteiller et al, OFC Laboratories, OCF 2002 Postdeadline Papers, pp. FB3–1 to FB3–3.

Third–Order Cascaded Raman Amplification, S.B. Papernyi et al., OFC Laboratories, OFC 2002 Postdeadline Papers, pp. FB4–1 to FB4–3.

* cited by examiner

US 6,480,326 B2

CASCADED PUMPING SYSTEM AND METHOD FOR PRODUCING DISTRIBUTED RAMAN AMPLIFICATION IN OPTICAL FIBER TELECOMMUNICATION SYSTEMS

This application claims priority of U.S. provisional patent application Ser. No. 60/217,104, filed Jul. 10, 2000.

FIELD OF THE INVENTION

This invention pertains to optical fiber Raman amplifiers and to optical fiber communication systems comprising such amplifiers and more specifically to a system and method for pumping the transmission fiber of an optical fiber telecommunication span to produce distributed Raman gain in the fiber for amplifying the signal(s) being transmitted along the fiber span.

BACKGROUND OF THE INVENTION

Until relatively recently, the amplification of optical signals in fiber-optic telecommunication systems has been achieved primarily through the use of discrete optical amplifiers, mainly erbium-doped fiber amplifiers (EDFAs). The explosive growth in the demand for increased capacity in fiber-optic communication systems has resulted in renewed interest in using distributed Raman amplification. See for instance, P. B. Hansen et al., IEEE Photonics Technology Letters, Vol. 9 (2), p. 262, (February 1997). In this approach, the transmission fiber itself is used as an amplifying medium for signals as they travel towards a repeater or receiving terminal, and the resulting gain is distributed over a length (typically tens of kilometers) of the fiber. Distributed amplification has an important advantage over discrete amplification. The effective noise figure of a distributed amplifier is significantly lower than that of a discrete amplifier having the same gain. See for instance, P. B. Hansen et al., Optical Fiber Technology, Vol. 3, p.221, (1997). This is a direct result of the gain occurring back in the span rather than at the end. The resulting improvement in noise performance not only allows increased capacity and/or span length in unrepeatered systems, but also allows for an increase in the number of spans between costly signal regenerators in multi-span repeatered systems. In addition, Raman amplification offers the possibility of ultra-broadband amplification, since the Raman gain spectrum in silica fiber, even for a single pump wavelength, is relatively broad and can be broadened further by using multiple pump wavelengths. See for instance, K. Rottwitt et al., Proceedings Optical Fiber Communication Conference, Paper PD-6, (February 1998). This is an important consideration for high-capacity wavelength division multiplexed (WDM) systems.

To produce Raman gain in the transmission fiber for signals in a particular wavelength band requires that the fiber be pumped at a relatively high-power level (hundreds of mW) at a wavelength, or wavelengths, shifted down from the signal wavelength(s) by an amount corresponding to the characteristic Raman shift of the fiber. For typical silica fiber, the Raman gain spectrum consists of a relatively broad band centered at a shift of ~440 cm$^{-1}$. Therefore, to provide gain for signals in the C-band (1530 to 1565 nm) for example, requires pump energy in the 1455-nm region.

In typical prior-art distributed Raman amplification embodiments, the output of a high-power laser source (e.g. a Raman fiber laser with a center wavelength of ~1455 nm) or a group of multiplexed laser diodes with wavelengths in the 1455-nm region is launched from a receiving or repeater terminal to pump the fiber and provide gain for the incoming C-band signals. To extend the amplification bandwidth for high-capacity WDM systems, the launched pump spectrum is broadened by using multiple Raman lasers (each with a predetermined power and wavelength) or by multiplexing additional laser diodes of specific wavelength and power.

A characteristic set of power vs. distance curves for the pump, the signals and the noise generated by the amplification process are shown in FIG. 1 (in this graph, distance is referenced from the receiving or repeater terminal). As can be seen in FIG. 1, the gain region is distributed over a length of the transmission fiber extending ~70 km back into the span. However, the bulk of the gain occurs in the last ~15 km of the span. To further increase the noise performance advantage of distributed Raman amplification, it is desirable to pump the transmission fiber in a manner which "pushes" the gain region further back in the span.

In K. Rottwitt et al., Proceedings European Conference Optical Communication, Vol. II, p.144, (September 1999), the authors report a pumping scheme which involves launching a high-power (800 mW) source at a wavelength of 1366 nm from the transmitter terminal, to provide Raman gain along the transmission fiber for 1455-nm energy launched from the receiving terminal. Thus, the power at 1455 nm, which provides the Raman gain for the signals at 1550 nm, is amplified along the fiber according to the local value of the power at 1366 nm. As a result, for the particular case they considered (an 80-km long span with 200 mW at 1455 nm launched from the receiving terminal), a substantial amount of signal gain occurs near both the transmitter and receiver ends of the span and the gain, on average, occurs further back in the span. The authors measured a 3-dB improvement in noise figure and a 1-dB improvement in receiver sensitivity (or link margin) as compared to conventional backward pumping. However, this pumping scheme, particularly if it is to be applied to longer spans (e.g. 125 km), requires two relatively expensive, relatively high-power (in the many hundreds of mW) sources. This disadvantage is exacerbated for the case of high-capacity WDM systems where broadening the gain bandwidth would require even more such sources. In addition, in links where the launch power of the signals is at or very near the limit set by considerations of adverse nonlinear effects in the fiber, the addition of substantial amplification immediately after signal launch could lead to link performance impairments due to these nonlinear effects.

Despite the already-demonstrated potential of distributed Raman amplification for providing low-noise, broadband amplification, there is an ever-present need for further performance improvements and cost reductions in optical communication systems. Thus, a distributed Raman amplifier pumping scheme, such as that disclosed in this application, which results in still lower noise and an increased flexibility and cost effectiveness in broadening and dynamically controlling the gain spectrum is highly desirable.

SUMMARY OF THE INVENTION

In a broad aspect, the invention provides a pumping scheme for producing distributed Raman amplification in the transmission fiber of an optical fiber communication system, according to which, the high pump power at the wavelength(s) required for amplification of the transmitted signals is developed within the transmission fiber itself, rather than being launched directly into the fiber. This pumping method can result in significantly lower amplifier noise and increased flexibility and cost effectiveness in broadening and dynamically controlling the gain spectrum compared to prior-art pumping methods.

More specifically, in a typical exemplary embodiment, a 'primary' pump source at a predetermined wavelength $\lambda_p$, shorter than the ultimately desired pump wavelength(s) $\lambda_{f1} \ldots \lambda_{fk}$, is launched into the transmission fiber along with one or more lower-power, low-cost secondary 'seed' sources at wavelength(s) $\lambda_{s1} \ldots \lambda_{sn}$, where $n \geq 1$ and $\lambda_p < \lambda_{sn} \leq \lambda_{fk}$. The wavelength and power of the secondary seed source(s) are specifically chosen such that, in the presence of the pump power at $\lambda_p$, a series of n stimulated Raman conversions ultimately lead to high power at the final desired pump wavelength(s) $\lambda_{f1} \ldots \lambda_{fk}$, where $k \leq n$, being present in the transmission fiber.

In a particular exemplary embodiment, a primary pump source at a wavelength of 1276 nm is launched together with two lower-power secondary sources having wavelengths of 1355 and 1455 nm. Energy at the primary pump wavelength of 1276 nm first undergoes a stimulated Raman conversion to 1355 nm and then, in the second step of a Raman cascade, the resulting high power at 1355 nm is converted to yield high power at 1455 nm, the pump wavelength required to produce distributed Raman amplification of signals in the 1550-nm region. In an extension of this exemplary embodiment, a third low-power source having a wavelength of ~1430 nm is launched along with the above mentioned primary and secondary sources. As a result of the presence of this additional seed source, the conversion of the high power at 1355 nm in the second step of the Raman cascade is shared between the two wavelengths, 1430 and 1455 nm, leading to high power at both these wavelengths, and a broadening of the resulting Raman gain profile for the transmitted signals. In accordance with the invention, further broadening of the gain spectrum can be achieved by launching additional low-cost seed sources of predetermined wavelength and power. Furthermore, the magnitude and the spectral the profile of the gain can be dynamically controlled by selectively altering the power of the low-power seed sources. Additional flexibility in the dynamic control of the gain spectrum results if the wavelength of one or more of the secondary seed sources is tunable.

In another exemplary embodiment, which is a variant of the foregoing example, the secondary source at 1355 nm is replaced by a reflection means (e.g. a gold reflector or a fiber Bragg grating with peak reflectivity at 1355 nm). Spontaneous Raman scattering of the high-power primary pump at 1276 nm produces radiation in the 1355-nm region traveling in both directions in the transmission fiber. As it travels in the fiber, this 1355-nm radiation is amplified due to the Raman gain at 1355 nm produced by the 1276-nm pump. In addition, some of the outgoing 1355-nm radiation undergoes Rayleigh backscattering and heads back towards the pump launch terminal, being further amplified as it goes. The 1355-nm reflector sends the incoming amplified spontaneous Raman scattered radiation back into the transmission fiber, where it performs the same role as the 1355-nm seed source in the foregoing example. In an extension of this exemplary embodiment, the 1455-nm seed source is also replaced by a reflector, thereby totally eliminating the need for active secondary sources, such as laser diodes, and further reducing costs.

In preferred embodiments, the primary pump and secondary seed source(s) are counter propagating with respect to the transmitted signals. However, the invention also provides for co-propagating configurations which can be used to advantage compared to prior-art co-pumping methods, since the peak gain region occurs at some distance from the transmitter terminal, thereby lessening adverse non-linear effects.

In a further embodiment, with counter-propagating distributed Raman preamplification being applied at the receiving end of a span, one or more moderate-power sources at wavelengths $\lambda_{ss1} \ldots \lambda_{ssj}$, where the $\lambda_{ssj}$ are shorter than the $\lambda_{fk}$ by an amount corresponding to the Raman shift in the transmission fiber, are launched from the transmitter terminal, thereby providing Raman gain for the residual incoming counter-propagating final pump wavelengths $\lambda_{fk}$, which in turn provides some distributed Raman amplification for the outgoing signals. The magnitude and/or spectral profile of this additional Raman amplification can be dynamically controlled by selectively altering the power and/or wavelength (if any $\lambda_{ssj}$ is tunable) of the moderate-power source(s), thereby allowing dynamic gain control and flattening to be applied near the transmitter terminal rather than at the receiving terminal, where it is less effective due to time-of-flight issues. This application of the invention can also be used to advantage in cases where the traditional direct Raman pumping scheme is being utilized at the receiving terminal.

According to a broad aspect of the present invention, there is provided a method of pumping the transmission fiber of an optical fiber telecommunications span to produce distributed Raman gain in the fiber for signals being transmitted along the fiber span, the method comprising the steps of: providing one or more primary pump sources at wavelengths $\lambda_{p1} \ldots \lambda_{pi}$, shorter than the pump wavelengths $\lambda_{f1} \ldots \lambda_{fk}$ ultimately required to directly produce distributed Raman gain for the signal wavelengths; providing substantially lower energy at one or more secondary seed wavelengths $\lambda_{s1} \ldots \lambda_{sn}$, where $n \geq 1$ and $\lambda_{pi} < \lambda_{sn} \leq \lambda_{fk}$; and propagating the energy at the primary pump wavelengths and secondary seed wavelengths in the transmission fiber; and wherein the primary pump wavelengths $\lambda_{pi}$ are less than the wavelengths $\lambda_{fk}$ by an amount corresponding to m Raman shifts in the transmission fiber, where $m \geq 1$, and where, if $m > 1$, the ensemble of secondary seed wavelengths $\lambda_{sn}$ includes at least one in the vicinity of each intermediate wavelength $\lambda_l$, where $l = m-1$, $m-2 \ldots 1$, and denotes the number of Raman shifts in the transmission fiber between the wavelength $\lambda_l$ and the ultimately required wavelengths $\lambda_{fk}$; and wherein the ensemble of the secondary seed wavelengths $\lambda_{sn}$ includes each ultimately required pump wavelength $\lambda_{fk}$.

According to another broad aspect of the present invention, there is provided a method for applying dynamic control of the magnitude and/or the spectral profile of the distributed Raman gain at, or near, the signal launch terminal of an optical fiber telecommunications span in which counter-propagating distributed Raman preamplification is being applied at the receiving or repeater end of the span or at some intermediate point along the span, resulting in residual energy at the final direct-pumping wavelengths $\lambda_{fk}$ nearing the signal launch terminal, the method comprising the steps of: providing one or more moderate-power secondary pump sources at wavelengths $\lambda_{ss1} \ldots \lambda_{ssj}$, shorter, by an amount corresponding to the Raman shift in the transmission fiber, than the pump wavelengths $\lambda_{f1} \ldots \lambda_{fk}$ ultimately required to directly produce distributed Raman gain for the signal wavelengths; providing coupling means to input radiation from said secondary pump sources at the $\lambda_{ssj}$ into the transmission fiber from the signal launch terminal of the span or from an intermediate point near said signal launch terminal, to travel in a co-propagating direction with respect to the signals; and providing means to selectively alter the power and/or the wavelength of said secondary pump sources at the $\lambda_{ssj}$ to dynamically control the Raman gain experienced by the incoming radiation at the final direct-pumping wavelengths $\lambda_{fk}$, and thereby to dynamically control the magnitude and/or the spectral profile of the resulting additional Raman gain experienced by the signals being launched.

According to a further broad aspect of the present invention, there is provided a system for pumping the transmission fiber of an optical fiber telecommunications span to produce distributed Raman gain in the fiber for amplifying signals being transmitted along the fiber span, and which comprises: one or more primary pump sources at wavelengths $\lambda_{p1} \ldots \lambda_{pi}$, shorter than the pump wavelengths $\lambda_{f1} \ldots \lambda_{fk}$ ultimately required to directly produce distributed Raman gain for the signal wavelengths, wherein the one or more primary pump source wavelengths $\lambda_{p1} \ldots \lambda_{pi}$ are shorter than the wavelengths $\lambda_{fk}$ by an amount corresponding to m Raman shifts in the transmission fiber, where m≧1; means to provide substantially lower energy at one or more secondary seed wavelengths $\lambda_{s1} \ldots \lambda_{sn}$, where n≧1 and $\lambda_{pi} < \lambda_{sn} \leq \lambda_{fk}$, and where, if m>1, the ensemble of the one or more secondary seed wavelengths includes at least one in the vicinity of each intermediate wavelength $\lambda_l$, where l=m−1, m−2 . . . 1 and denotes the number of Raman shifts in the transmission fiber between the wavelength $\lambda_l$, and the ultimately required wavelengths $\lambda_{fk}$, and wherein the ensemble of the one or more secondary seed wavelengths $\lambda_{sn}$ includes each ultimately required pump wavelength $\lambda_{fk}$; and coupling means to input energy from the one or more primary pump sources at wavelengths $\lambda_{p1} \ldots \lambda_{pi}$ and energy at the one or more secondary seed wavelengths $\lambda_{s1} \ldots \lambda_{sn}$, into said transmission fiber.

According to another broad aspect of the invention, there is provided a system for applying dynamic control of the magnitude and/or spectral profile of the distributed Raman gain at, or near, the signal launch terminal of an optical fiber telecommunications span in which counter-propagating distributed Raman preamplification is being applied at the receiving end of the span, which comprises: one or more moderate-power secondary pump sources at wavelengths $\lambda_{ss1} \ldots \lambda_{ssj}$, shorter than the pump wavelengths $\lambda_{f1} \ldots \lambda_{fk}$ ultimately required to directly produce distributed Raman gain for the signal wavelengths, wherein the one or more secondary pump source wavelengths $\lambda_{ss1} \ldots \lambda_{ssj}$ are shorter than the wavelengths $\lambda_{fk}$ by an amount corresponding to the Raman shift in the transmission fiber; residual radiation at the final direct-pumping wavelengths $\lambda_{fk}$ travelling toward the signal launch terminal in a counter-propagating direction with respect to the signals; coupling means to input radiation from the one or more secondary pump sources at wavelengths $\lambda_{ss1} \ldots \lambda_{ssj}$ into the transmission fiber from the signal launch terminal of the fiber span, or from an intermediate point near the signal launch terminal, to travel in a co-propagating direction with respect to the signals; and means to selectively alter the power and/or wavelength of the one or more secondary pump sources at wavelengths $\lambda_{ss1} \ldots \lambda_{ssj}$ to dynamically control the Raman gain experienced by the incoming radiation at the final direct-pumping wavelengths D and thereby to dynamically control the magnitude and/or spectral profile of the resulting additional Raman gain experienced by the signals being launched.

BRIEF DESCRIPTION OF THE DRAWINGS

The invention will be better understood by an examination of the following description, together with the accompanying drawings, in which.

DETAILED DESCRIPTION

The application of distributed Raman amplification in fiber-optic telecommunication systems has been motivated by two key features of the distributed Raman amplification process. First, the distributed amplification process provides improved amplifier noise performance, as compared to discrete amplification, due to the fact that the gain occurs back in the transmission span rather than at the receiving or repeater terminal. Secondly, Raman amplification allows broadband amplification, since the Raman gain spectrum can be broadened by utilizing multiple pump wavelengths. A pumping scheme according to the invention can further improve the noise performance advantage of distributed amplification and can result in increased flexibility and cost effectiveness in broadening and dynamically controlling the Raman gain spectrum.

Figure 1:
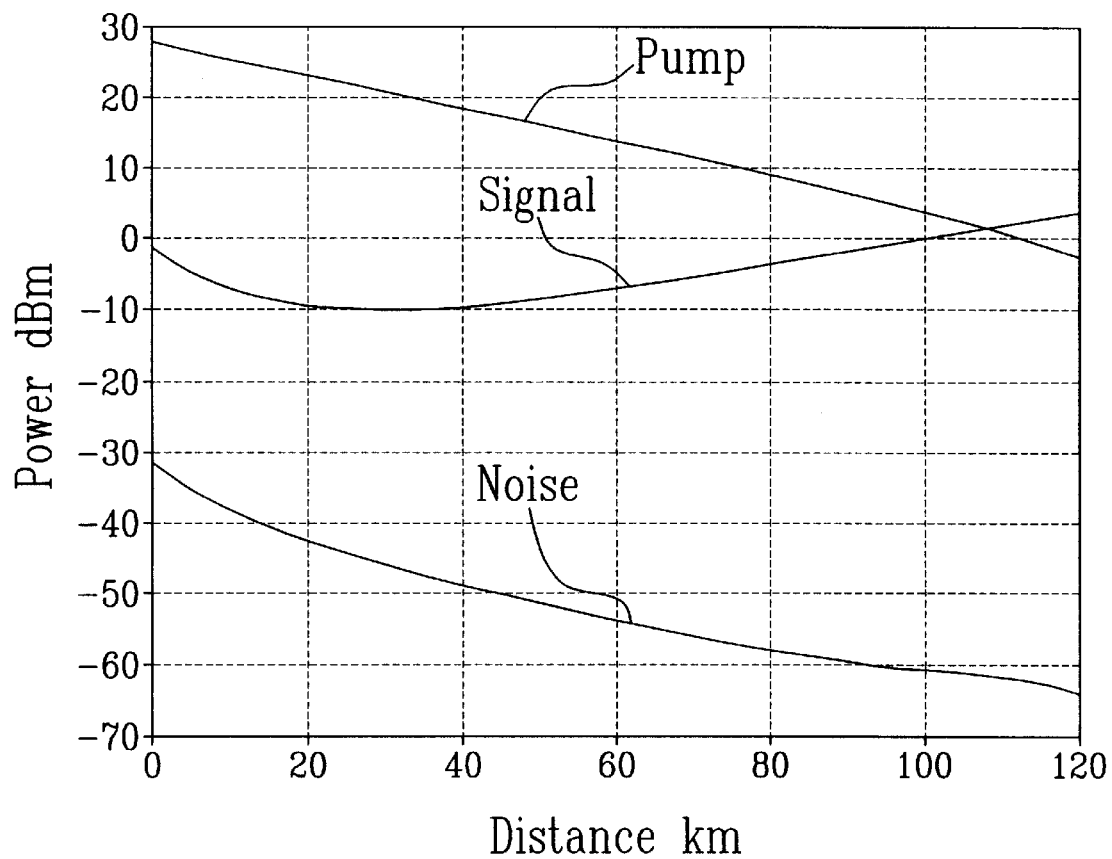
FIG. 1 is a graph showing the evolution of the power of the pump, the signal and the noise generated by the amplification process, versus distance from the receiving or repeater terminal, for distributed Raman amplification according to the prior art.
Figure 2:
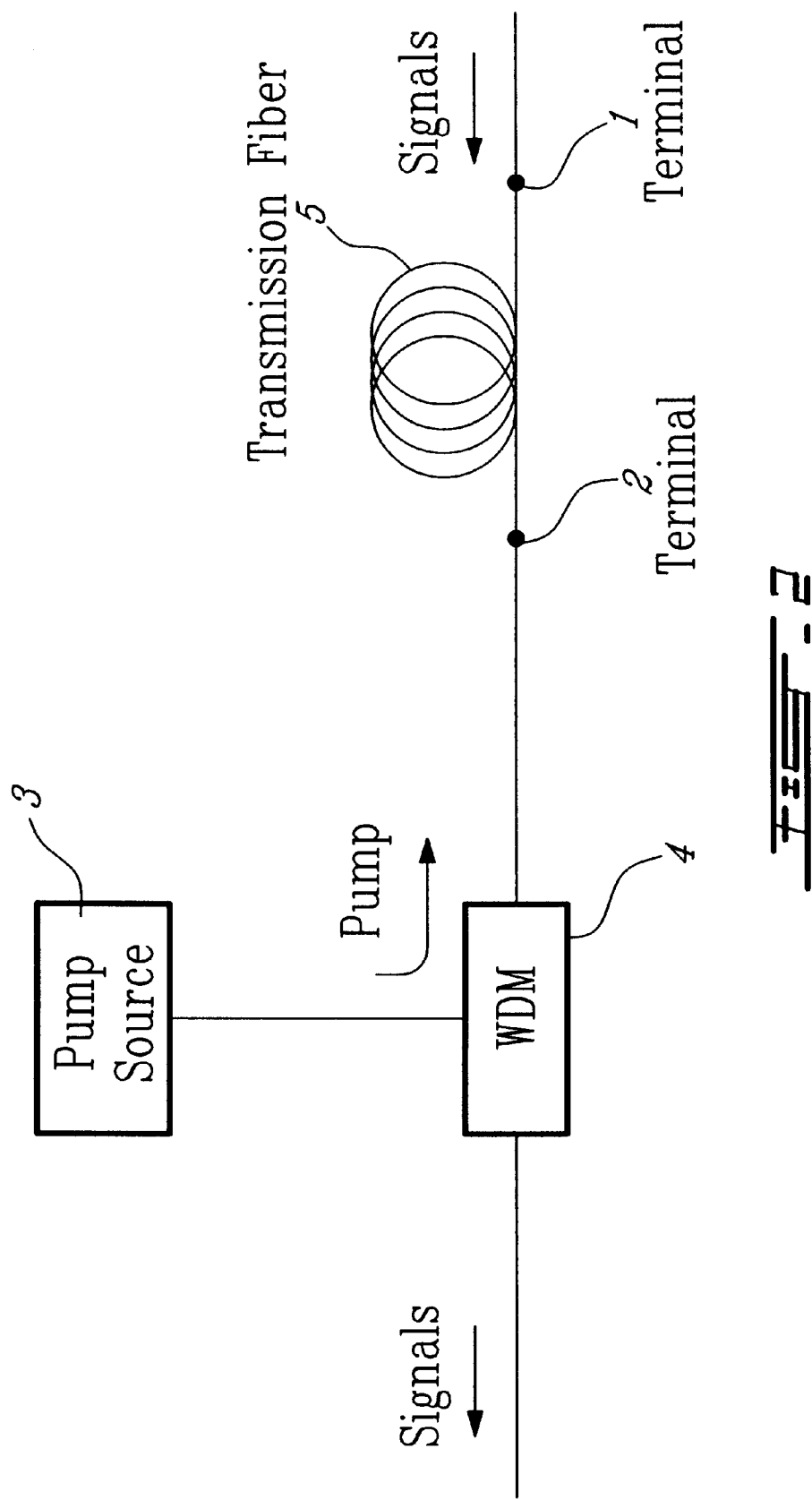
FIG. 2 is a block diagram showing a typical pumping scheme using a pump source connected via a WDM coupler to a transmission fiber in accordance with the prior art.

A generic fiber-optic telecommunication transmission span, employing distributed Raman amplification and a typical prior-art pumping scheme, is shown in FIG. 2. Terminal 1 can be either the transmitter terminal or alternatively, a repeater terminal. Analogously, terminal 2 can be the receiving terminal or a repeater terminal. For single-wavelength pumping, the pump source 3 is typically either a high-power (>500 mW) Raman fiber laser or a number of relatively high-power (>150 mW) polarization and/or wavelength multiplexed laser diodes of approximately equal wavelength. The wavelength of the Raman fiber laser or the multiplexed laser diodes is chosen so as to directly produce Raman gain in the transmission fiber for the incoming signals. For example, for signal wavelengths in the 1550-nm region in typical silica transmission fiber, a pump source wavelength of ~1455 nm is chosen. The output of the pump source 3 is coupled into the transmission fiber via a coupler 4 such as a wavelength division multiplexer (WDM)

and launched in a counter propagating direction with respect to the signals. The resulting characteristic set of power vs. distance (referenced to terminal 2) curves for the pump, the signals and the noise generated by the amplification process are shown in FIG. 1. As can be seen from the power vs. distance curve for the signals, the Raman gain begins to be apparent some 60 to 70 km back in the transmission span (where the decline in signal power, due to normal transmission losses in the fiber, begins to be reversed) and reaches its peak at the end of the span, where the pump power is a maximum. The fact that the gain is distributed over a length of the transmission fiber (i.e. the gain is 'pushed' back into the span) leads directly to a lower effective noise figure than locating a discrete amplifier having the same gain at terminal 2.

Figure 3:
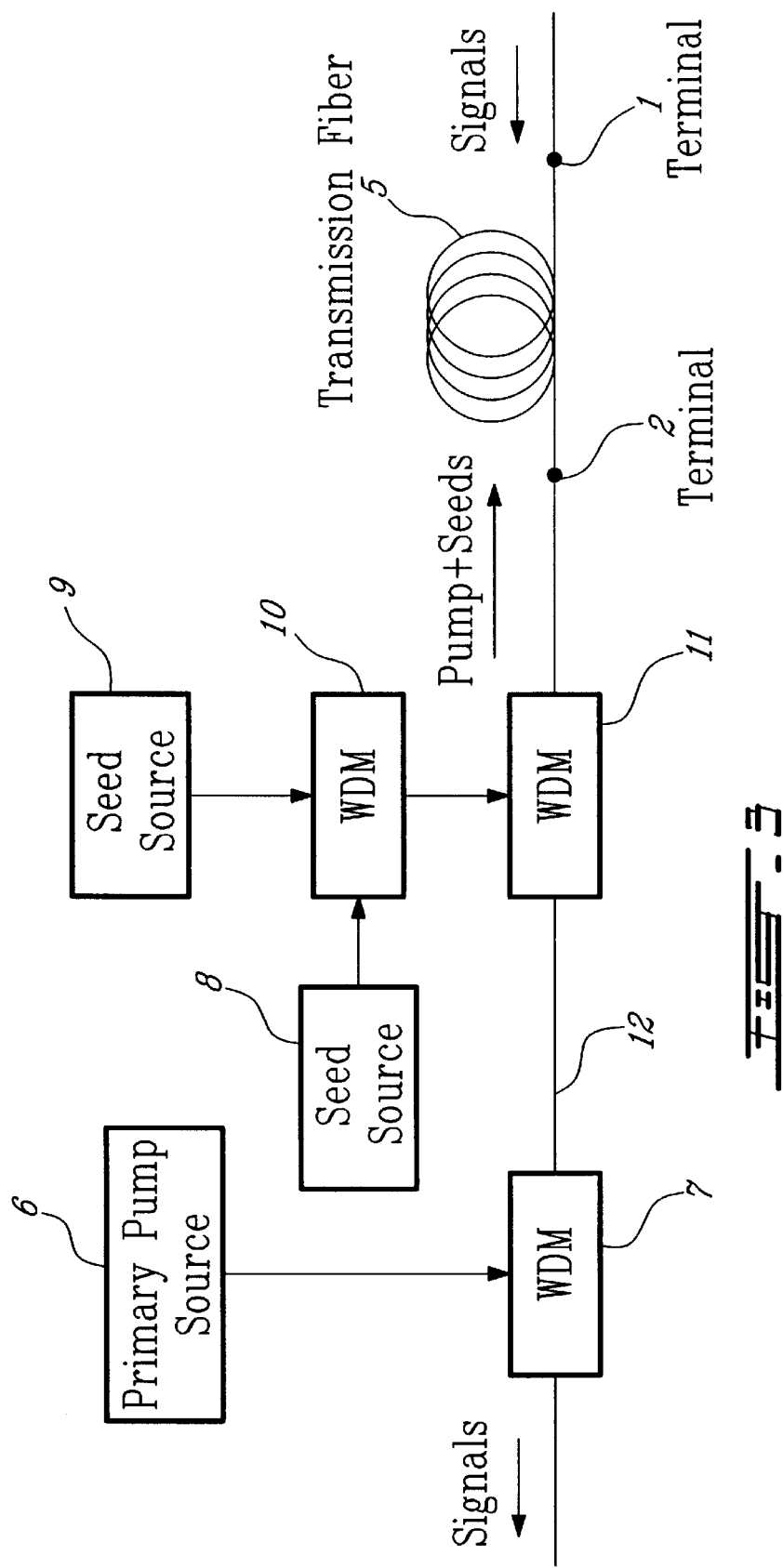
FIG. 3 is a block diagram showing one embodiment of the invention; a primary pump source and two seed sources are coupled into the transmission fiber.

The present invention provides a means of 'pushing' the gain still farther back in the span and thereby improving the span noise figure even further. FIG. 3 shows a generic transmission span employing distributed Raman amplification with pumping means according to an exemplary embodiment of the invention. In FIGS. 2 and 3, like reference numerals refer to like elements. Referring to FIG. 3, a high-power (>1 W) primary pump source 6 at wavelength $\lambda_p$ is coupled into the fiber section 12 via a WDM coupler 7, from where it passes through WDM coupler 11 and is launched into the transmission fiber in a counter-propagating direction with respect to the signals. The outputs of first and second low-power (typically tens of mW) laser diode seed sources 8 and 9 at wavelengths $\lambda_{s1}$ and $\lambda_{s2}$, respectively, are combined via a WDM coupler 10, coupled into the transmission fiber via WDM coupler 11 and launched to co-propagate with the pump energy at $\lambda_p$.

In the above exemplary embodiment, an essential element of the invention is that the wavelength $\lambda_p$ of the high-power primary pump source is shorter than the wavelength(s) $\lambda_{fk}$ ultimately required to provide Raman gain for the signal wavelength(s) $\lambda_{sig}$. More specifically, $\lambda_p$ must be less than $\lambda_{fk}$ by an amount corresponding to m successive Raman shifts in the transmission fiber, where m≧1. If m>1, it is also required that there be at least one source, among the secondary seed source wavelengths, in the vicinity of each intermediate wavelength $\lambda_l$, where l=m−1, m−2 . . . 1, and denotes the number of Raman shifts in the transmission fiber between $\lambda_l$ and the ultimately required wavelengths $\lambda_{fk}$. In addition, it is required that the ensemble of low-power seed source wavelengths $\lambda_{sn}$ includes each ultimately-required pump wavelength $\lambda_{fk}$. For example, for amplification of signals in the 1550-nm region, wavelengths $\lambda_p$, $\lambda_{s1}$ and $\lambda_{s2}$ may be chosen as 1276, 1355 and 1455 nm, respectively. In this example, the final required pump wavelength $\lambda_{fk}$ is 1455 nm (to which $\lambda_{s2}$ corresponds), 1276 nm is less than this wavelength by an amount corresponding to two successive Raman shifts in silica fiber and the intermediate wavelength 1355 nm is one Raman shift from 1455 nm. In this case, the pump energy at 1276 provides distributed Raman gain for the energy launched from the low-power seed source at 1355 nm, thus leading to a high power at this wavelength developing in the transmission fiber. This high power at 1355 nm in turn provides distributed Raman gain for the energy launched from the 1455 nm seed source, ultimately leading to the presence in the fiber of a high power at the wavelength required for the distributed Raman amplification of the 1550 nm signals.

Figure 4:
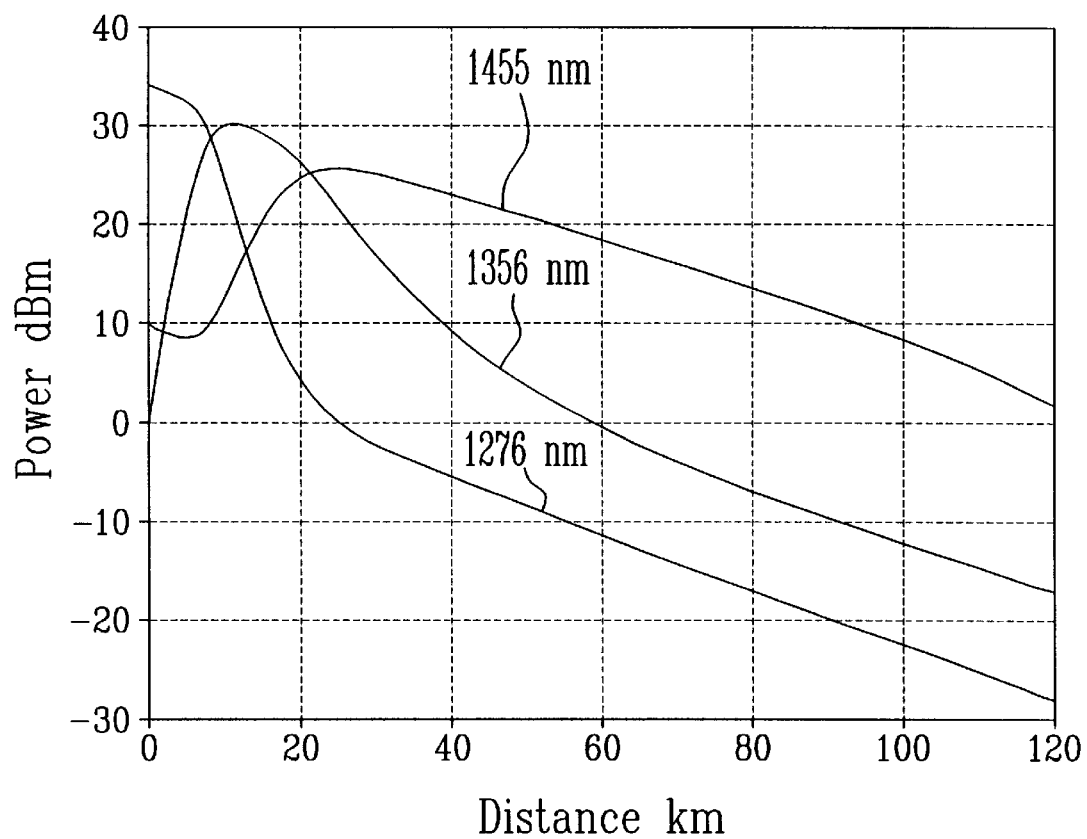
FIG. 4 is a graph showing the evolution of the power at the primary pump and the two secondary seed source wavelengths versus distance from the receiving or repeater terminal.
Figure 5:
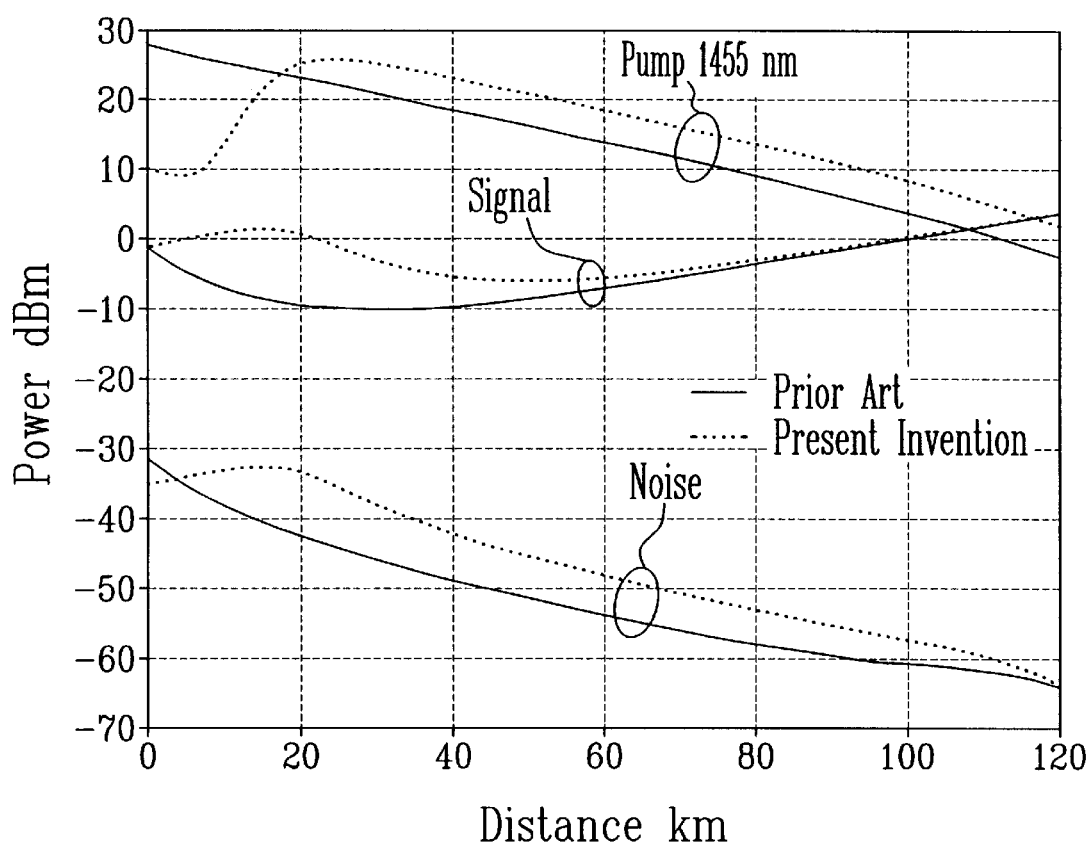
FIG. 5 is a graph showing a comparison of the evolution of the power of the final pump, the signal and the noise generated by the amplification process, versus distance from the receiving or repeater terminal, for pumping in accordance with the prior art and the present invention.

The fact that the high power at the wavelength required for amplification of the signals is itself developed in the transmission fiber through distributed Raman amplification, rather than being launched from terminal 2, means that the pump power at 1455 nm, and therefore the signal gain, peak at some distance from the terminal, and that the gain occurs on average further back in the transmission span than is the case with the prior-art pumping scheme of FIG. 2. The evolution of the powers at the three wavelengths for the exemplary case described above is shown in FIG. 4. The peak power at the final pump wavelength of 1455 nm occurs at a distance of ~25 km from the receiving or repeater terminal (terminal 2). FIG. 5 shows the final pump, signal and noise powers vs. distance (referenced to terminal 2) for this exemplary case compared to those obtained for the same final signal gain when pumping according to the typical prior-art scheme shown in FIG. 2. For pumping according the present invention, the Raman gain begins to become apparent ~85 km from the receiving or repeater terminal, as opposed to ~70 km for the prior-art pumping case. The signal and noise amplitudes peak at a distance of ~15 km from the terminal and actually decrease from that point on due to normal propagation losses in the fiber. For the equal-gain case shown in FIG. 5, the noise power reaching the terminal when pumping according to the present invention is ~3 dB less than for the prior-art pumping case. Conversely, for equal noise powers reaching the receiving or repeater terminal, the signal power for pumping according to the present invention will be ~3 dB higher. Consequently, the present invention provides a means to significantly improve the optical signal-to-noise ratio at the receiving or repeater terminal of a transmission span incorporating distributed Raman amplification.

The choice of source wavelengths and power, the number of primary pump and secondary low-power seed sources, the source of the energy at the seed wavelengths, the coupling means and the propagation direction relative to the signals described for the above exemplary embodiment are merely illustrative of the underlying principle of the invention: namely, that the energy at the pump wavelength(s) required for amplification of the transmitted signal(s) is developed and/or amplified and/or modified within the transmission fiber through stimulated Raman scattering interactions initiated by launching energy at wavelength(s) shorter than the final pump wavelength(s) by an amount corresponding to m successive Raman shifts, where m≧1.

For example, in a simplification of the above exemplary embodiment, a primary pump wavelength $\lambda_p$ of 1355 nm and a single seed source at 1455 nm could be chosen. Conversely, as an extension of the exemplary embodiment, one or more additional seed sources with wavelengths in the 1400 to 1500-nm range could be added to broaden and tailor the shape of the gain spectrum experienced by the signals. Furthermore, the powers of these seed sources (and/or their wavelengths, if they are tunable) could be selectively controlled to dynamically control the gain and its spectral profile (e.g. to compensate for gain changes and gain tilt resulting from channel add/drops). It is also envisaged that the primary pump source and/or the intermediate seed source (in this example, the source at 1355 nm), if there is one, may be configured to emit at more than one wavelength and may also allow selective control of the power at each wavelength to similarly broaden and control the gain profile. Alternatively, multiple primary pump sources and/or multiple intermediate seed sources, each of different wavelengths, may be utilized in a similar manner. Furthermore, wavelength-tunable primary pump source(s) and/or secondary seed source(s) may also be used to advantage for dynamic control of the gain spectrum.

It will also be apparent to those familiar with Raman amplification that the underlying principle of the invention is not limited to amplification of signals in the 1550-nm region. In fact, it can be applied to provide amplification of signals in any optical fiber telecommunications window. For example, in a variant of the particular case described in connection with FIG. 3, signals in the 1300-nm region (the first telecommunications window) could be similarly amplified by choosing $\lambda_p$, $\lambda_{s1}$, and $\lambda_{s2}$ as 1115, 1175 and 1240 nm, respectively.

Figure 6:
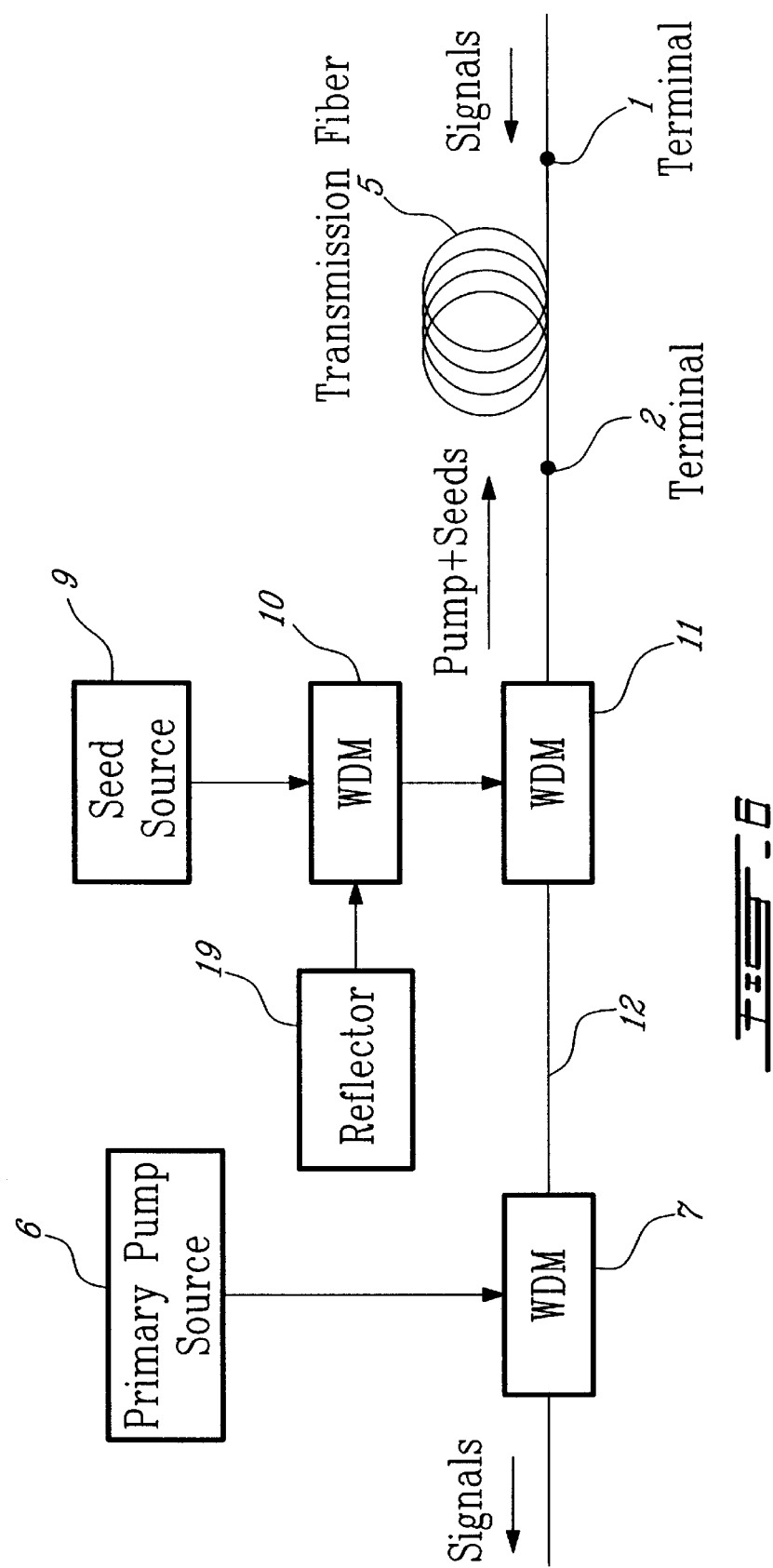
FIG. 6 is a block diagram showing another embodiment of the invention where one of the seed sources is a reflector.

FIG. 6 shows another exemplary embodiment in which the secondary seed source 8 of FIG. 3 at wavelength $\lambda_{s1}$ is replaced by reflection means 19, exemplarily a fiber Bragg grating with peak reflectivity at $\lambda_{s1}$. In FIGS. 3 and 6, like reference numerals refer to like elements. Referring to FIG. 6, as the high-power primary pump energy at wavelength $\lambda_p$ propagates down the transmission fiber, it undergoes spontaneous Raman scattering, producing radiation with the classic Raman-shifted spectral profile travelling in both directions in the fiber. This spontaneous Raman scattered radiation is amplified as it travels in the fiber due to the Raman gain provided by the high power at wavelength $\lambda_p$ present in the fiber. In addition, some of the outgoing spontaneous Raman scattered radiation undergoes backward Rayleigh scattering and is further amplified as it travels back towards terminal 2. The amplified spontaneous Raman scattered radiation (denoted here as ASE by analogy to 'amplified spontaneous emission' in optical amplifiers) returning to terminal 2 is coupled back through WDMs 11 and 10 to reflector 19. In the exemplary case where reflector 19 is a fiber Bragg grating with peak reflectivity at $\lambda_{s1}$, that part of the ASE spectrum at wavelength $\lambda_{s1}$ is reflected back through WDMs 10 and 11 and into the transmission fiber. In this exemplary embodiment, an amplifying cavity for radiation at the desired seed wavelength $\lambda_{s1}$ is formed by reflector 19 and a distributed Rayleigh 'mirror'. This leads to substantial energy at wavelength $\lambda_{s1}$ being present in the transmission fiber in the vicinity of terminal 2, where it performs the same role as the launched seed source at $\lambda_{s1}$ in the example of FIG. 3.

The exact details discussed in connection with FIG. 6 are not meant to limit the principles of this embodiment of the invention: namely, that the energy at one or more of the desired seed wavelengths may be provided by utilizing reflection means in place of laser sources at the seed wavelengths. For example, alternate reflection means such as a gold reflector may be used in place of the fiber Bragg grating discussed in the foregoing example. In addition, seed sources may be entirely eliminated by substituting reflection means for both seed sources of FIG. 6. In a further example of this principle of the invention, the spectral breadth of the Raman ASE, in the vicinity of each intermediate wavelength $\lambda_I$, as well as the final-pump wavelength region at $\lambda_{fk}$, can be exploited to advantage. Replacing a particular source (or sources) with multiple fiber Bragg gratings, each having a different peak-reflectivity wavelength within the ASE spectrum, allows tailoring and broadening of the gain spectrum experienced by the signals. For example, for amplification of signals in the 1550-nm region, with $\lambda_p$ and $\lambda_{s1}$ chosen as 1276 and 1355 nm, respectively, a series of two fiber Bragg gratings, one with a peak reflectivity at ~1430 nm and the other at 1455 nm, could be used in place of a single seed source at 1455 nm to broaden the gain spectrum. Tailoring of the shape of the gain spectrum can be accomplished through the selection of the magnitude of the reflectivity of the Bragg grating at each wavelength. Furthermore, if the two Bragg gratings are connected in a parallel fashion (e.g. one to each input fiber of a WDM combining coupler), dynamic control of the gain and its spectral profile can be applied by inserting a variable optical attenuator (VOA) between each grating and the combining coupler and selectively altering the attenuation of each VOA.

Figure 7:
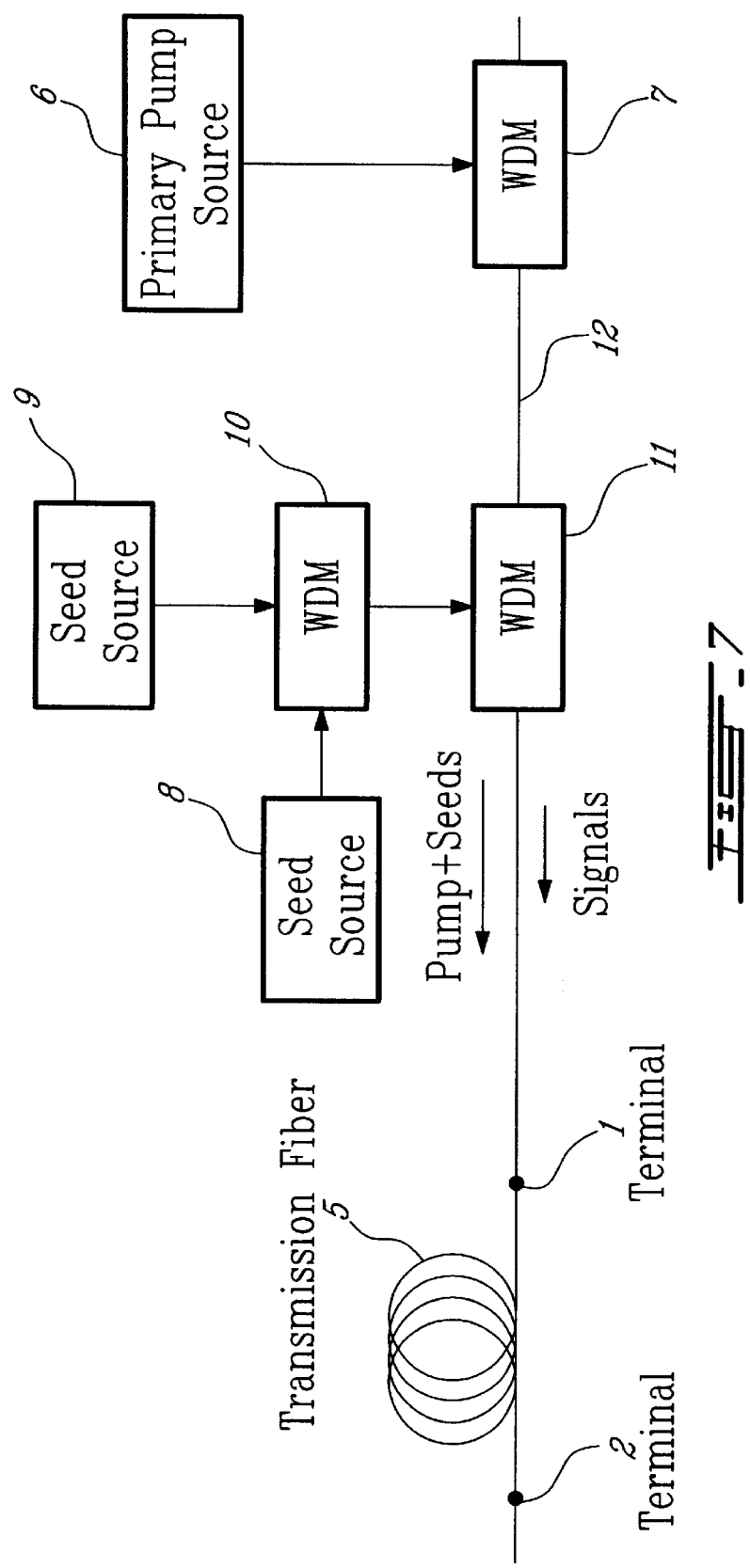
FIG. 7 is a block diagram showing another embodiment of the invention where the signals, the primary pump and the secondary seed sources propagate in the same direction.

FIG. 7 shows another exemplary embodiment in which the outputs of the primary pump source and the low-power seed sources are launched into the transmission fiber in a co-propagating direction with respect to the signals. In FIGS. 3 and 7, like reference numerals refer to like elements. Prior-art co-propagating pumping schemes lead to poor amplifier performance due to nonlinear effects resulting from high Raman gain immediately following signal launch and/or due to pump-signal crosstalk. Pumping in a co-propagating direction according to the present invention reduces the adverse impact of nonlinear effects due to the fact that the peak gain region is pushed some distance into the transmission span from the signal and pump launch terminal.

Figure 8:
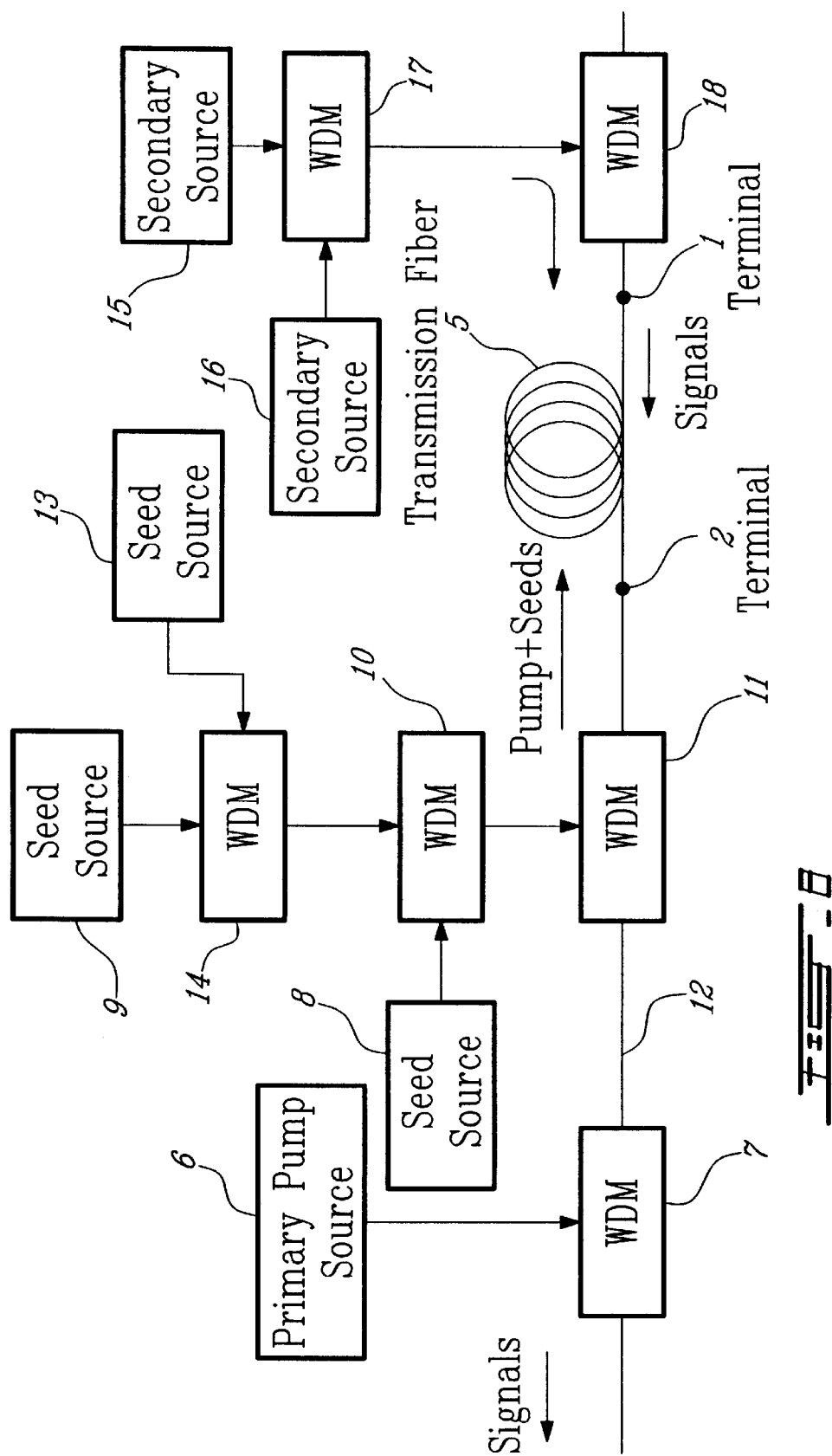
FIG. 8 is a block diagram showing another embodiment of the invention where secondary intermediate-wavelength sources are launched from the signal launch terminal to apply dynamic gain control and flattening near the beginning of the span.

FIG. 8 shows another exemplary embodiment of the invention which is an extension of the embodiment shown in FIG. 3. In FIGS. 3 and 8, like reference numerals refer to like elements. Referring to FIG. 8, the output of an additional seed source 13 with a wavelength $\lambda_{s3}$ is combined with that of the seed source 9 at $\lambda_{s2}$ via a WDM coupler 14. The dual-wavelength output of the WDM coupler 14 is then combined with the output of seed source 8 via WDM coupler 10 and launched into the transmission fiber via WDM coupler 11 to co-propagate with the pump energy at $\lambda_p$. The wavelength $\lambda_{s3}$ is chosen to be in the wavelength region ultimately required for amplification of the signals, but sufficiently different from that of any other seed source (or sources) in that wavelength region so as to result in the broadening and tailoring of the gain spectrum experienced by the signals. For example, in the particular case discussed in connection with FIG. 3, where $\lambda_p$, $\lambda_{s1}$, and $\lambda_{s2}$ are 1276, 1355 and 1455 nm, respectively, $\lambda_{s3}$ might be chosen as 1430 nm, to extend the gain bandwidth on the short wavelength side of the C-band and /or to flatten the gain profile over the short wavelength end of the C-band.

At the other end of the transmission span, two moderate-power (typically in the 100 to 300 mW range) secondary sources 15 and 16 at wavelengths $\lambda_{ss1}$ and $\lambda_{ss2}$ are combined via WDM coupler 17 and launched into the transmission fiber from terminal 1 via WDM coupler 18. Each of the sources 15 and 16 may be a Raman fiber laser or a single laser diode or a number of multiplexed laser diodes of essentially equal wavelength. The wavelengths $\lambda_{ss1}$ and $\lambda_{ss2}$ are chosen to provide Raman gain in the transmission fiber for the residual incoming energy at the wavelengths $\lambda_{fk}$ required for Raman amplification of the signals. For example, for the particular choice of wavelengths discussed above, $\lambda_{ss1}$ and $\lambda_{ss2}$ in the 1355-nm region would be chosen to provide Raman gain for the incoming energy at 1430 and 1455 nm. The amplification of the residual incoming energy at the wavelengths $\lambda_{fk}$ provides some additional distributed Raman gain for the outgoing signals. The exact values of the two wavelengths $\lambda_{ss1}$ and $\lambda_{ss2}$ are chosen so as to optimize the ability to tailor the spectral profile of this additional gain by selectively altering the power of these two secondary sources. This then provides a means of applying an element of dynamic gain control and gain flattening (e.g. to compensate for gain changes and gain tilt resulting from channel add/drops) near the signal launch terminal rather than at the receiving terminal, where it is less effective due to time-of-flight issues.

The exact details described in the foregoing example are merely illustrative of this application of the invention. For example, the advantage that accrues from applying dynamic control of the gain and/or the gain shape at the signal launch terminal, by launching secondary pump sources to provide gain for the incoming signal-amplifying pump wavelengths, is not limited to launching two secondary pumps. More generally, this principle could be used to advantage with any number N of secondary pumps, where $N \geq 1$. Also, even in cases where there is only a single incoming wavelength $\lambda_{fk}$, this principle allows dynamic control of the magnitude of the gain to be applied at the signal launch terminal. Furthermore, this application of the invention can also be used to advantage in cases where the traditional prior-art direct Raman pumping scheme is being used at terminal 2.

The exemplary embodiments that have been described are merely illustrative of the application of the principles of the present invention and are not intended to limit the scope of the invention. Further arrangements and methods can be implemented by those skilled in the art without departing from the spirit and the scope of the invention as set forth in the appended claims. For example, if reflector 19 in FIG. 6 is a fiber Bragg grating with its reflectivity peak outside the band of the transmitted signals, it could be located directly in the fiber line between WDM 11 and terminal 2 and WDM 10 eliminated. Similarly, if seed source 9 is replaced by a fiber grating and its reflectivity peak lies outside the transmitted signal band, it could also be located in the fiber line, leading to the elimination of WDM 11. As a further example, WDM coupler 11 in FIGS. 3 and 8 could be replaced by a three-port optical circulator and the primary pump source 6 combined with the output of WDM coupler 10 via an additional WDM coupler inserted between WDM coupler 10 and the circulator. WDM coupler 7 would then no longer be required. Instead, an inline signal-passband filter could be inserted to reject backscattered pump light. This arrangement would allow the coupling of seed sources at ultimately-desired pump wavelengths sufficiently separated so that the longer final-pump wavelength(s) overlap signal wavelengths being amplified under the gain curve generated by the shorter final-pump wavelength(s). In addition, the pumping scheme according to the present invention may be employed at the transmit end of a link, at the receiving end, at an intermediate point or at a combination of these locations. Furthermore, the seed source(s) may be positioned in near proximity to the primary pump source(s), or at another point along the transmission fiber.

EXAMPLE 1

An experimental fiber-optic transmission span, incorporating distributed Raman preamplification substantially as shown FIG. 3, was set up. The primary pump source was a high-power Raman fiber laser (MPB Communications Inc. Model RRP-1276) operating at a wavelength of 1276 nm. A low-power (1.5 mW) laser diode followed by an optical isolator and having a wavelength of 1355 nm was selected for one of the secondary seed sources. The principle goal of the experiment was to allow direct comparison of the noise performance of distributed Raman preamplification implemented according to the present invention with that of the prior-art direct- pumping scheme. Therefore, a high-power Raman fiber laser (MPB Communications Inc. Model RRP-1455) operating at a wavelength of 1455 nm was utilized to provide either the second low-power seed source energy or the high-power direct-pump energy for the signals in the 1550 nm region. The output of this Raman laser was fed through an isolator into a variable optical attenuator (VOA), inserted between the laser and WDM coupler 10 of FIG. 3. Varying the setting of this VOA allowed easy switching from the low-power seed-source mode to the high-power direct-pumping mode. In the latter case, both the high-power laser at 1276 nm and the low-power laser diode at 1355 nm were turned off. The transmission span consisted of 100 km of Corning $LS_+$ fiber. A single 2.5 Gb/s signal at a wavelength of 1547.72 nm was launched into the fiber at the far end of the span through a VOA. The signal exiting WDM 7 in FIG. 3 was fed into a low-noise optical receiver having a front-end erbium-doped fiber preamplifier with a noise figure of 4 dB. Bit-error-rate (BER) measurements were made for equal Raman gain conditions for the two pumping schemes as a function of the setting of the VOA at the transmitter end of the span.

With no Raman gain (i.e. with all pump and seed source lasers turned off), a BER of $10^{-9}$ was obtained for a signal launch power of −12.9 dBm. With the direct prior-art pumping scheme and a 1455-nm launch power of 450 mW (corresponding to an optimum Raman gain of 24.2 dB), the same BER was achieved with a signal launch power of −22.1 dBm, corresponding to a link margin improvement of 9.2 dB. For pumping according to the present invention, a gain of 24.2 dB was achieved by launching 2.1 W at 1276 nm, 1.0 mW at 1355 nm and 2 mW at 1455 nm. In this case, a BER of $10^{-9}$ was achieved with a signal launch power of −24.4 dBm. Thus, a pumping scheme according to the present invention yielded a further link margin improvement of 2.3 dB when compared to the prior-art direct-pumping scheme.

The 1355-nm laser diode was then replaced by a gold reflector. In this case, a gain of 24.2 dB was achieved by launching 1.7 W at 1276 nm and 2.5 mW at 1455 nm. Under these conditions, the BER measurements again demonstrated a 2.3 dB improvement in link margin compared to the prior-art direct-pumping scheme.

EXAMPLE 2

The transmission span of Example 1 was modified by replacing the 100 km of $LS_+$ fiber with 100 km of SMF-28 fiber. In addition, provision was made to allow the 1455-nm input fiber of WDM coupler 10 of FIG. 3 to be switched from the output of the VOA following the 1455-nm Raman laser to a connectorized length of fiber with a 1455-nm high-reflectivity (99.9%) fiber Bragg grating written in it. Also, owing to the lower Raman gain in SMF-28 fiber (compared to $LS_+$ fiber), all measurements were carried out with the gold reflector of Example 1 in place of the laser diode at 1355 nm.

With no Raman gain (i.e. with the 1276-nm and 1455-nm Raman lasers turned off), a BER rate of $10^{-9}$ was obtained for a signal launch power of −13.8 dBm. With the prior-art direct-pumping scheme and a 1455-nm launch power of 850 mW (corresponding to an optimum Raman gain of 24 dB), the same BER was obtained for a signal launch power of −22.8 dBm, corresponding to a link margin improvement of 9 dB. For pumping according to the present invention and with the 1455-nm Raman laser used to provide the seed source energy at 1455 nm, a Raman gain of 24 dB was achieved by launching 3 W at 1276 nm and 30 mW at 1455 nm. In this case, a BER of $10^{-9}$ was obtained for a signal launch power of −25.0 dBm, corresponding to a further 2.2 dB improvement in link margin.

The 1455-nm Raman laser was then replaced by the 1455-nm fiber Bragg grating reflector. In this case, a Raman gain of 24 dB was achieved by launching 3 W at 1276 nm and a BER of $10^{-9}$ was obtained for a signal launch power of −25.3 dBm, corresponding to an improvement in link margin of 2.5 dB compared to the prior-art direct-pumping scheme.

What is claimed is:

1. A system for pumping a transmission fiber of an optical fiber telecommunications span to produce distributed Raman gain in the fiber for amplifying signals being transmitted along the fiber span, comprising:

one or more primary pump sources at wavelengths $\lambda_{p1} \ldots \lambda_{pi}$, shorter than pump wavelengths $\lambda_{f1} \ldots \lambda_{fk}$ ultimately required to directly produce distributed Raman gain for the signal wavelengths; wherein the wavelengths $\lambda_{p1} \ldots \lambda_{pi}$, of said one or more primary pump sources are shorter than said wavelengths $\lambda_{f1} \ldots \lambda_{fk}$ by an amount corresponding to m Raman shifts in said transmission fiber, where $m \geq 1$;

means to provide substantially lower energy at one or more secondary seed wavelengths $\lambda_{s1} \ldots \lambda_{sn}$, where $n \geq 1$ and $\lambda_{pi} < \lambda_{sn} \leq \lambda_{fk}$; wherein said means to provide substantially lower energy at one or more of said secondary seed wavelengths comprise reflection means to return, into said transmission fiber, amplified spontaneous Raman scattered radiation, originating in said fiber due to the presence of high power at a wavelength one Raman shift below the particular seed wavelength, and wherein (i) the ensemble of said one or more secondary seed wavelengths $\lambda_{s1} \ldots \lambda_{sn}$ includes each ultimately-required wavelength $\lambda_{fk}$; and (ii) if m>1, the ensemble of said secondary seed wavelengths $\lambda_{s1} \ldots \lambda_{sn}$ includes at least one in the vicinity of each intermediate wavelength $\lambda_l$, where $l=m-1$, $m-2 \ldots 1$ and denotes the number of Raman shifts in said transmission fiber between said wavelength $\lambda_l$ and the ultimately required wavelengths $\lambda_{f1} \ldots \lambda_{fk}$; and coupling means to input energy at said one or more primary pump source wavelengths $\lambda_{p1} \ldots \lambda_{pi}$ and energy at said one or more secondary seed wavelengths $\lambda_{s1} \ldots \lambda_{sn}$, into said transmission fiber.

2. The system of claim 1, wherein at least one of said one or more primary pump sources at wavelengths $\lambda_{p1} \ldots \lambda_{pi}$ comprises a Raman fiber laser operating at one or a plurality of wavelengths.

3. The system of claim 1, wherein at least one of said one or more primary pump sources at wavelengths $\lambda_{p1} \ldots \lambda_{pi}$ comprises a number of polarization- and/or wavelength-multiplexed laser diodes of essentially equal wavelength.

4. The system of claim 1, wherein said energy provided at one or more of said secondary seed wavelengths $\lambda_{s1} \ldots \lambda_{sn}$ further comprises energy provided by one or more optical sources.

5. The system of claim 1, wherein at least one of said one or more primary pump sources at wavelengths $\lambda_{p1} \ldots \lambda_{pi}$ is a tunable pump source.

6. The system of claim 1, wherein at least one of said one or more secondary seed wavelengths $\lambda_{s1} \ldots \lambda_{sn}$ is a tunable secondary seed wavelength.

7. The system of claim 1, wherein said energy provided at said one or more secondary seed wavelengths $\lambda_{s1} \ldots \lambda_{sn}$ and said energy provided from said one or more primary pump sources at wavelengths $\lambda_{p1} \ldots \lambda_{pi}$ are launched into said transmission fiber from a receiving or repeater terminal in a counter-propagating direction with respect to said signals.

8. The system of claim 1, wherein said energy provided at said one or more secondary seed wavelengths $\lambda_{s1} \ldots \lambda_{sn}$ and said energy provided from said one or more primary pump sources at wavelengths $\lambda_{p1} \ldots \lambda_{pi}$ are launched into said transmission fiber from a transmitter or repeater terminal in a co-propagating direction with respect to said signals.

9. The system of claim 1, wherein said energy provided at said one or more secondary seed wavelengths $\lambda_{s1} \ldots \lambda_{sn}$ and said energy provided from said one or more primary pump sources at wavelengths $\lambda_{p1} \ldots \lambda_{pi}$ are launched into said transmission fiber from some point intermediate between transmitter and receiver or repeater terminals, either to co-propagate or to counter propagate with said signals.

10. The system of claim 1, wherein said energy provided at one or more of said one or more secondary seed wavelengths $\lambda_{s1} \ldots \lambda_{sn}$ and said energy provided at said one or more primary pump source wavelengths $\lambda_{p1} \ldots \lambda_{pi}$ are launched into said transmission fiber from separate launch locations simultaneously, in co-propagating and/or counter-propagating directions with respect to said signals.

11. The system of claim 1, wherein said means for coupling energy at said one or more primary pump source wavelengths $\lambda_{p1} \ldots \lambda_{pi}$ into said transmission fiber includes at least one optical circulator.

12. The system of claim 11, wherein said optical circulator further couples energy at said one or more secondary seed wavelengths $\lambda_{s1} \ldots \lambda_{sn}$, into said transmission fiber.

13. The system of claim 1, wherein said reflection means is a fiber Bragg grating.

14. The system of claim 13, wherein the peak reflection wavelength of said fiber Bragg grating is tunable.

15. The system of claim 1, wherein said reflection means is a broadband reflector.

16. A system for applying dynamic control of the magnitude and/or spectral profile of the distributed Raman gain at, or near, a signal launch terminal of an optical fiber telecommunications span in which counter-propagating distributed Raman preamplification is being applied at a receiving or repeater end of the span or at some intermediate point along the span, resulting in residual energy at final direct-pumping wavelengths $\lambda_{f1} \ldots \lambda_{fk}$ nearing said signal launch terminal, said system comprising:

one or more moderate-power secondary pump sources at wavelengths $\lambda_{ss1} \ldots \lambda_{ssj}$, shorter than the pump wavelengths $\lambda_{f1} \ldots \lambda_{fk}$ ultimately required to directly produce distributed Raman gain for the signal wavelengths, wherein said one or more secondary pump source wavelengths i are shorter than said wavelengths $\lambda_{f1} \ldots \lambda_{fk}$ by an amount corresponding to the Raman shift in the transmission fiber;

coupling means to input radiation from said one or more secondary pump sources at wavelengths $\lambda_{ss1} \ldots \lambda_{ssj}$ into the transmission fiber from said signal launch terminal of an optical fiber telecommunications span or from an intermediate point near said launch terminal, to travel in a co-propagating direction with respect to said signals; and means to selectively alter the power and/or wavelength of said one or more secondary pump sources at wavelengths $\lambda_{ss1} \ldots \lambda_{ssj}$ to dynamically control the Raman gain experienced by said incoming residual radiation at said final direct- pumping wavelengths $\lambda_{f1} \ldots \lambda_{fk}$ and thereby to dynamically control the magnitude and/or spectral profile of the resulting additional Raman gain experienced by the signals being launched.

17. The system as claimed in claim 16, wherein at least one of said one or more secondary pump sources at wavelengths $\lambda_{ss1} \ldots \lambda_{ssj}$ is a Raman fiber laser operating at one or a plurality of wavelengths.

18. The system as claimed in claim 16, wherein the output wavelength of at least one of said one or more secondary pump sources at wavelengths $\lambda_{ss1} \ldots \lambda_{ssj}$ is tunable.

19. A method of pumping a transmission fiber of an optical fiber telecommunications span to produce distributed Raman gain in the fiber for signals being transmitted along said fiber span, said method comprising the steps of:

(a) providing energy at one or more primary pump source wavelengths $\lambda_{p1} \ldots \lambda_{pi}$, shorter than pump wavelengths $\lambda_{f1} \ldots \lambda_{fk}$ ultimately required to directly produce distributed Raman gain for the signal wavelengths;

(b) providing substantially lower energy at one or more secondary seed wavelengths $\lambda_{s1} \ldots \lambda_{sn}$, where $n \geq 1$ and $\lambda_{pi} < \lambda_{sn} \leq \lambda_{fk}$, wherein said energy at one or more of said one or more secondary seed wavelengths is provided by returning into the transmission fiber, by reflection means, amplified spontaneous Raman scattered radiation, originating in the fiber due to the presence of high power at a wavelength one Raman shift below the particular seed wavelength; and (c) propagating the energy at the primary pump wavelengths and secondary seed wavelengths in said transmission fiber; and wherein (i) said primary pump wavelengths $\lambda_{p1} \ldots \lambda_{pi}$, are shorter than said wavelengths $\lambda_{f1} \ldots \lambda_{fk}$ by an amount corresponding to m Raman shifts in said transmission fiber, where $m \geq 1$;

(ii) the ensemble of said secondary seed wavelengths $\lambda_{s1} \ldots \lambda_{sn}$ includes each ultimately required pump wavelength $\lambda_{f1} \ldots \lambda_{fk}$; and (iii) if $m > 1$, the ensemble of secondary seed wavelengths $\lambda_{s1} \ldots \lambda_{sn}$ includes at least one in the vicinity of each intermediate wavelength $\lambda_l$, where $l = m-1, m-2 \ldots 1$, and denotes the number of Raman shifts in said transmission fiber between said wavelength $\lambda_l$ and the ultimately required wavelengths $\lambda_{f1} \ldots \lambda_{fk}$.

20. A method according to claim 19, wherein the energy at the primary pump wavelengths and the secondary seed wavelengths are launched into the transmission fiber from a receiving or repeater terminal in a counter-propagating direction with respect to said signals.

21. A method according to claim 19, wherein the energy at the primary pump wavelengths and the secondary seed wavelengths are launched into the transmission fiber from a transmitter or repeater terminal in a co-propagating direction with respect to said signals.

22. A method according to claim 19, wherein said energy provided at one or more of said one or more secondary seed wavelengths $\lambda_{s1} \ldots \lambda_{sn}$ and said energy provided at said one or more primary pump source wavelengths $\lambda_{p1} \ldots \lambda m_{pi}$ are launched into said transmission fiber from separate launch locations simultaneously, in co-propagating and/or counter-propagating directions with respect to said signals.

23. A method according to claim 19, wherein the power and/or the wavelengths of the primary pump radiation and/or the secondary seed radiation is (are) selectively altered to dynamically control the Raman gain and/or the gain spectral profile, to compensate for gain changes and/or gain tilt resulting from changes in the powers and/or wavelengths of the transmitted signal channels.

24. A method of applying dynamic control of the magnitude and/or the spectral profile of the distributed Raman gain at, or near, a signal launch terminal of an optical fiber telecommunications span in which counter-propagating distributed Raman preamplification is being applied at a receiving or repeater end of the span or at some intermediate point along the span, resulting in residual energy at final direct-pumping wavelengths $\lambda_{f1} \ldots \lambda_{fk}$ nearing said signal launch terminal, said method comprising the steps of:

(a) providing one or more moderate-power secondary pump sources at wavelengths $\lambda_{ss1} \ldots \lambda_{ssj}$ shorter, by an amount corresponding to the Raman shift in the transmission fiber, than the pump wavelengths $\lambda_{f1} \ldots \lambda_{fk}$ ultimately required to directly produce distributed Raman gain for the signal wavelengths;

(b) using coupling means to input radiation from the secondary pump sources at the $\lambda_{ss1} \ldots \lambda_{ssj}$ into said transmission fiber at the signal launch terminal of the span or at an intermediate point near the launch terminal, to travel in a co-propagating direction with respect to the signals;

(c) selectively altering the power and/or wavelength of the secondary pump sources at the $\lambda_{ss1} \ldots \lambda_{ssj}$ to dynamically control the Raman gain experienced by said residual incoming radiation at the final pump wavelengths $\lambda_{f1} \ldots \lambda_{fk}$ and thus dynamically control the magnitude and/or the spectral profile of the resulting additional Raman gain experienced by the signals being launched; and wherein, the secondary pump wavelengths $\lambda_{ss1} \ldots \lambda_{ssj}$ is (are) shorter than the wavelengths $\lambda_{f1} \ldots \lambda_{fk}$ by an amount corresponding to the Raman shift in the transmission fiber.

25. A method of pumping a transmission fiber of an optical fiber telecommunications span to produce distributed Raman gain in the fiber for signals being transmitted along said fiber span, said method comprising the steps of:

(a) providing energy at one or more primary pump source wavelengths $\lambda_{p1} \ldots \lambda_{pi}$, shorter than pump wavelengths $\lambda_{f1} \ldots \lambda_{fk}$ ultimately required to directly produce distributed Raman gain for the signal wavelengths;

(b) providing substantially lower energy at one or more secondary seed wavelengths $\lambda_{s1} \ldots \lambda_{sn}$, where $n \geq 1$ and $\lambda_{pi} < \lambda_{sn} \leq \lambda_{fk}$, wherein at least one of said one or more secondary seed wavelengths $\lambda_{s1} \ldots \lambda_{sn}$ is wavelength tuned to tailor the spectral profile of the Raman gain experienced by said signals; and (c) propagating the energy at the primary pump wavelengths and secondary seed wavelengths in said transmission fiber; and wherein (i) said primary pump wavelengths $\lambda_{p1} \ldots \lambda_{pi}$, are shorter than said wavelengths $\lambda_{f1} \ldots \lambda_{fk}$ by an amount corresponding to m Raman shifts in said transmission fiber, where $m \geq 1$;

(ii) the ensemble of said secondary seed wavelengths $\lambda_{s1} \ldots \lambda_{sn}$ includes each ultimately required pump wavelength $\lambda_{f1} \ldots \lambda_{fk}$; and (iii) if $m > 1$, the ensemble of secondary seed wavelengths $\lambda_{s1} \ldots \lambda_{sn}$ includes at least one in the vicinity of each intermediate wavelength $\lambda_l$, where $l = m-1, m-2 \ldots 1$, and denotes the number of Raman shifts in said transmission fiber between said wavelength $\lambda_l$ and the ultimately required wavelengths $\lambda_{f1} \ldots \lambda_{fk}$.

26. The method according to claim 19, wherein said one or more primary pump source wavelengths $\lambda_{p1} \ldots \lambda_{pi}$ and said one or more secondary seed wavelengths $\lambda_{s1} \ldots \lambda_{sn}$ are selected in order to broaden and/or tailor the spectral profile of the Raman gain experienced by said signals.

27. The system of claim 4, wherein said optical source providing energy at a particular one of said secondary seed wavelengths $\lambda_{s1} \ldots \lambda_{sn}$ comprises a laser diode or a pair of polarization-multiplexed laser diodes of equal wavelength.

28. The system of claim 4, wherein said optical source providing energy at a particular one of said one or more secondary seed wavelengths $\lambda_{s1} \ldots \lambda_{sn}$ is a wavelength-tunable source.

* * * * *